United States Patent [19]

Ohe et al.

[11] Patent Number: 4,823,142

[45] Date of Patent: Apr. 18, 1989

[54] AUTOMOBILE ANTENNA SYSTEM

[75] Inventors: Junzo Ohe, Toyota; Hiroshi Kondo, Okazaki, both of Japan

[73] Assignee: Toyota Jidosha Kabushiki Kaisha, Toyota, Japan

[21] Appl. No.: 876,704

[22] Filed: Jun. 20, 1986

[30] Foreign Application Priority Data

| Jun. 21, 1985 | [JP] | Japan | 60-136691 |
| Jun. 21, 1985 | [JP] | Japan | 60-136692 |
| Jun. 21, 1985 | [JP] | Japan | 60-136693 |
| Jul. 31, 1985 | [JP] | Japan | 60-170181 |

[51] Int. Cl.$^4$ .............................................. H01Q 1/32
[52] U.S. Cl. .................................................. 343/713
[58] Field of Search .......................... 343/711, 712, 713

[56] References Cited

U.S. PATENT DOCUMENTS

| 2,200,674 | 5/1940 | McDonald, Jr. | 343/712 |
| 2,212,253 | 8/1940 | Stief | 343/711 |
| 2,404,093 | 7/1946 | Roberts | 343/705 |
| 2,481,978 | 9/1949 | Clough | 343/712 |
| 2,520,986 | 9/1950 | Williams et al. | 343/712 |
| 2,575,471 | 11/1951 | Schweiss et al. | 343/712 |
| 2,774,811 | 12/1956 | Shanok et al. | 343/711 |
| 2,859,441 | 11/1958 | Rosenbaum | 343/712 |
| 2,950,479 | 12/1960 | Pan | 343/702 |
| 2,971,191 | 2/1961 | Davis | 343/712 |
| 3,007,164 | 10/1961 | Davis | 343/712 |
| 3,066,293 | 11/1962 | Davis | 343/712 |
| 3,210,766 | 10/1965 | Parker | 343/743 |
| 3,364,487 | 1/1968 | Maheux | 343/702 |
| 3,611,388 | 10/1971 | Okumura | 343/712 |
| 3,717,876 | 2/1973 | Volkers et al. | 343/712 |
| 3,728,732 | 4/1973 | Igarashi | 343/713 |
| 3,742,508 | 6/1973 | Tomaszewski | 343/713 |
| 3,794,997 | 2/1974 | Iwatsuki et al. | 343/712 |
| 3,823,403 | 7/1974 | Walter et al. | 343/708 |
| 3,916,413 | 10/1975 | Davis | 343/712 |
| 3,961,292 | 6/1976 | Davis | 333/32 |
| 3,961,330 | 6/1976 | Davis | 343/712 |
| 4,217,591 | 8/1980 | Czerwinski | 343/713 |
| 4,260,989 | 4/1981 | Ishii et al. | 343/713 |
| 4,278,980 | 7/1981 | Ogita et al. | 343/748 |
| 4,317,121 | 2/1982 | Allen, Jr. | 343/712 |
| 4,332,032 | 5/1982 | Daniel | |
| 4,339,827 | 7/1982 | Torres et al. | 455/188 |
| 4,394,779 | 7/1983 | Hansen | 343/713 |
| 4,499,606 | 2/1985 | Rambo | 455/277 |
| 4,506,267 | 3/1985 | Harmuth | 343/744 |

FOREIGN PATENT DOCUMENTS

| 2745475 | 4/1979 | Fed. Rep. of Germany | 343/712 |
| 9195811 | 12/1984 | Japan . | |
| 60-1008 | 1/1985 | Japan . | |
| 60-1009 | 1/1985 | Japan . | |
| 60-1010 | 1/1985 | Japan . | |
| 60-1011 | 1/1985 | Japan . | |
| 60-1012 | 1/1985 | Japan . | |

OTHER PUBLICATIONS

Japanese Pat. Abstract, vol. 6, No. 37 E-97 Mar. 6, 1982, 56-156031.

Japanese Pat. Abstract, vol. 6, No. 55 E-101 4/10/82, 56-168441.

Japanese Pat. Abstract, vol. 7, No. E-187, 7/15/83, 58-70640.

Japanese Pat. Abstract, vol. 7, No. 162 E-187, 7/15/83, 58-70642.

(List continued on next page.)

Primary Examiner—William L. Sikes
Assistant Examiner—Doris J. Johnson
Attorney, Agent, or Firm—Cushman, Darby & Cushman

[57] ABSTRACT

An automobile antenna system for receiving broadcast waves by means of a plurality of antennas, which are provided on a vehicle body, outputs the receiving signal from the antenna which enjoys the optimum reception by automatic changeover. The antenna system includes a pair of glass antennas disposed on the rear window or side windows of the vehicle body and a pair of high-frequency pickups disposed on both sides of the vehicle body apart from the glass antennas by a predetermined distance for effectively picking up high-frequency surface currents which are induced on a vehicle body by broadcast waves, these four antennas constituting a diversity antenna.

10 Claims, 16 Drawing Sheets

OTHER PUBLICATIONS

Abstract of 55-88407, Antenna Device, 7/4/1980.
Abstract of 60-169204 On Vehicle Antenna System, 9/2/1985.
Abstract of 60-172804 Antenna System For Vehicle, 9/6/1985.
Article entitled "Multipath Reception in FM Car Radio Receivers and Antenna Diversity by Means of a Distortion Detector" by Lindenmeier and Reiter in Germany, pp. 187–190, dated 1983.
Abstract of 56-162503 Antenna for vehicle dated 12/14/81.
English Translations of Japanese publications, 60-1008; 60-1009; 60-1010; 60-1011; 60-1012; 59-195811.
English Translation of German patent 1949828 (submitted earlier).
Abstract of 57-188103, Antenna for Radio Receiver of Automobile Japanese, dated 11/19/82.
Japanese Abstract of 58-70647, Receiver for Car, dated 4/27/83.

GAP BETWEEN RETAINER AND
HEADER INNER PANEL ($\times 10^{-3} \times$ WAVELENGTH)

F I G . 14
(a) 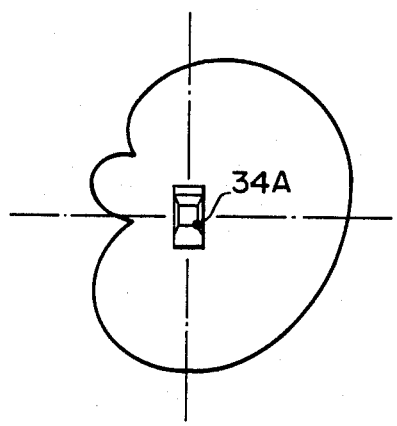
(b) 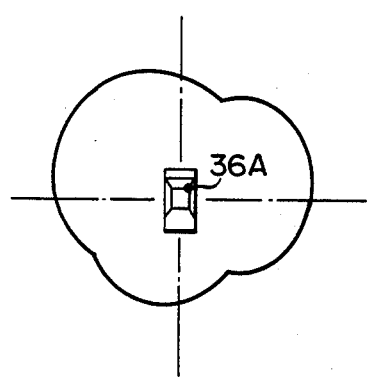
F I G . 17
(a) 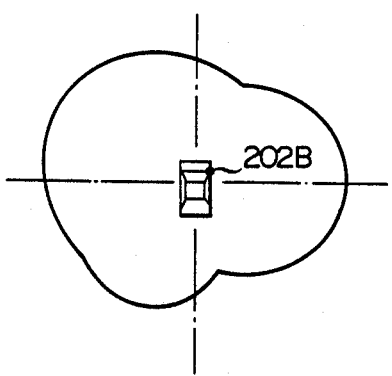
(b) 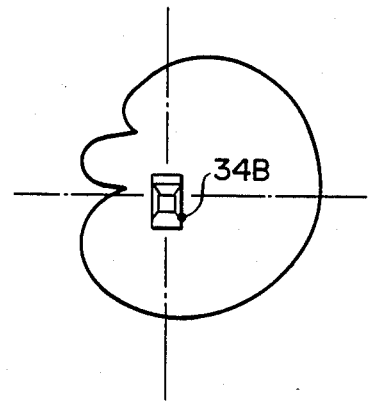

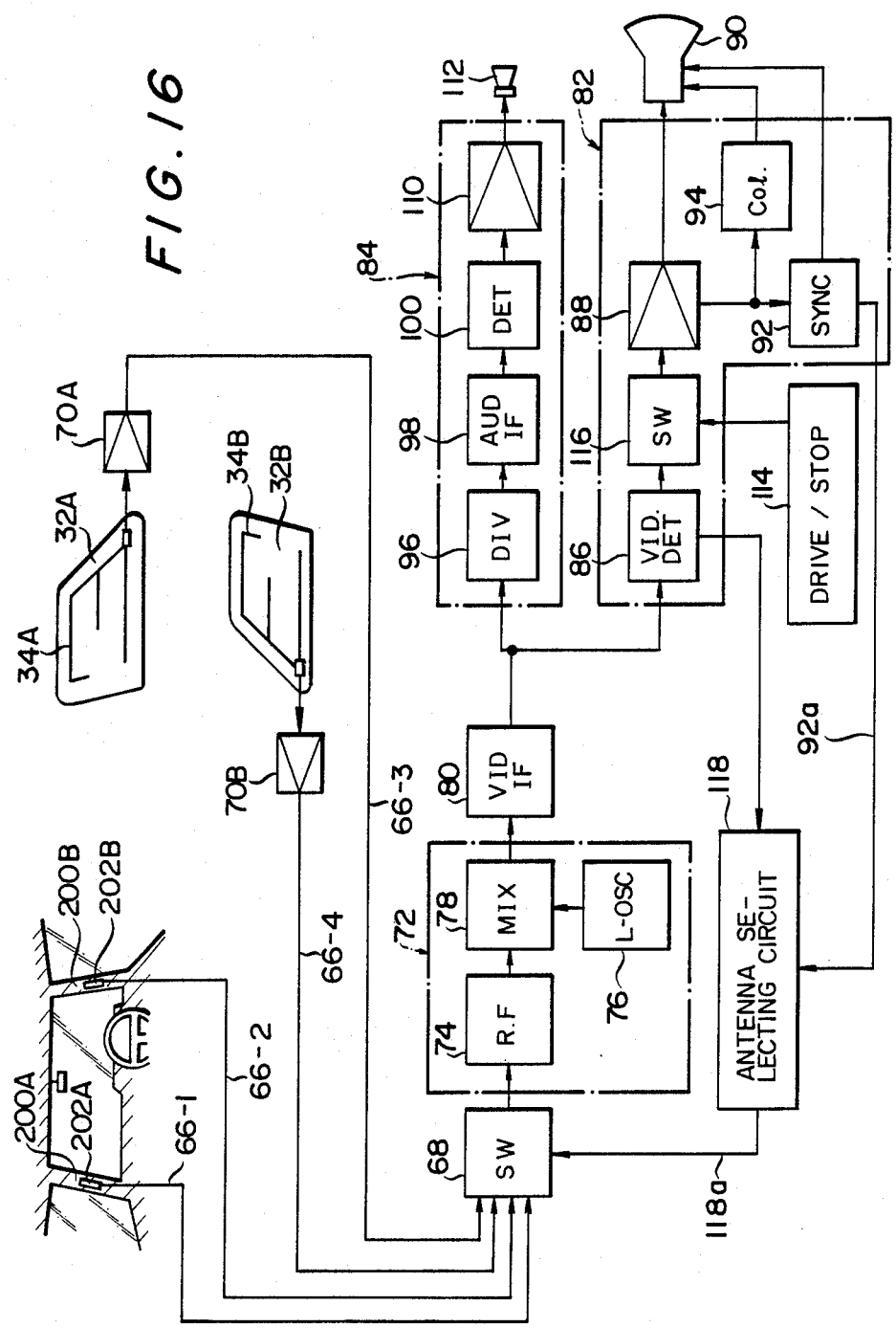

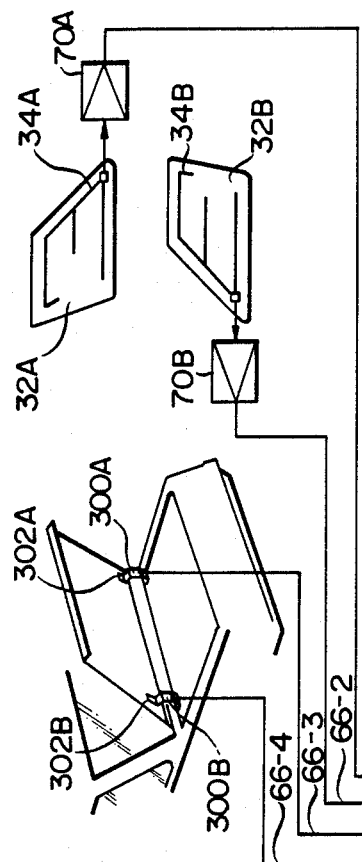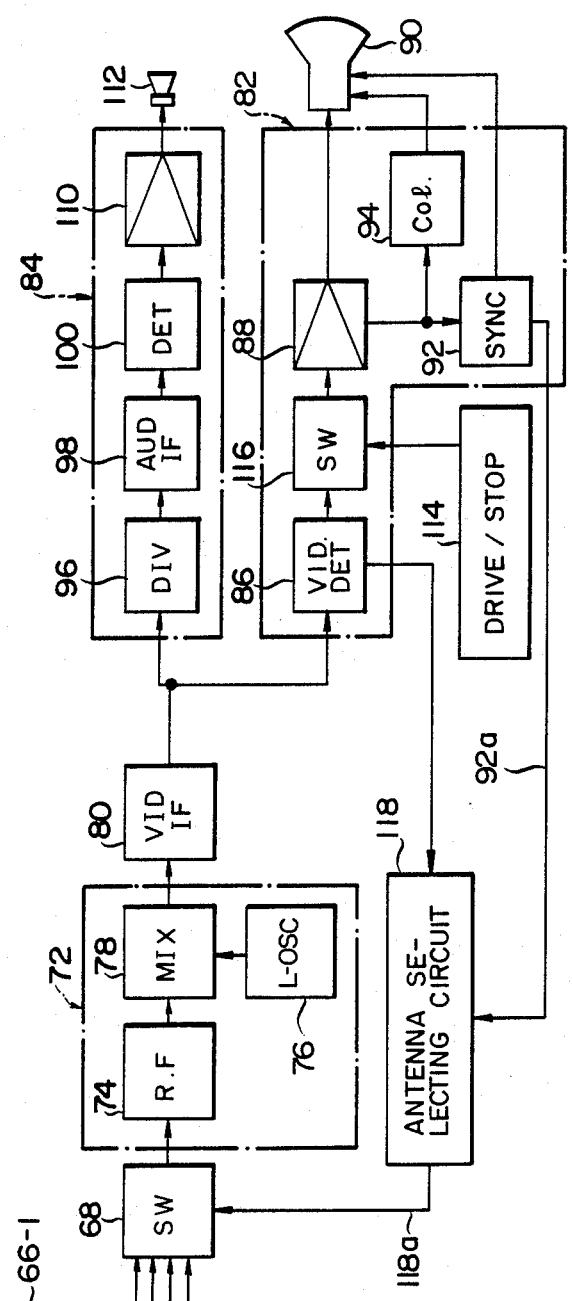
FIG. 21

FIG. 24
(a) 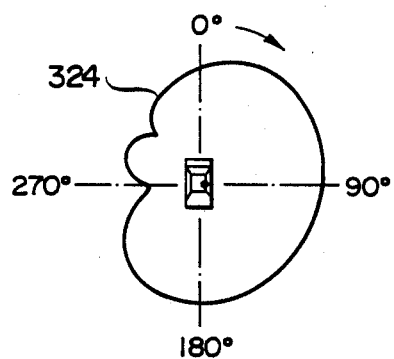
(b) 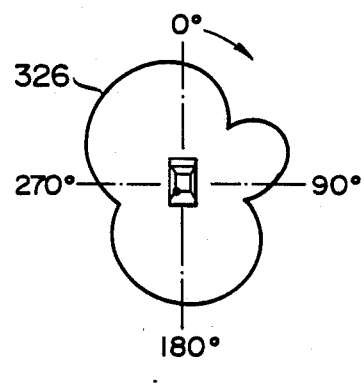
FIG. 25
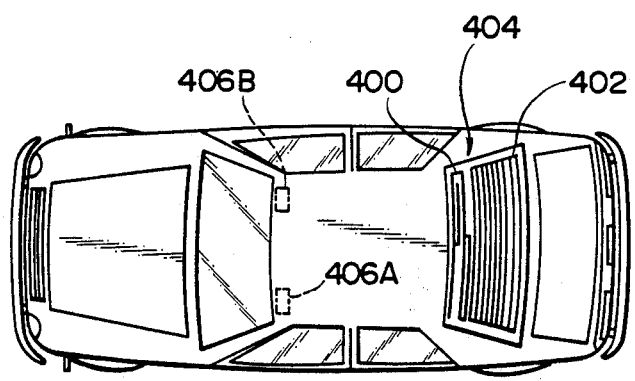

FIG. 27
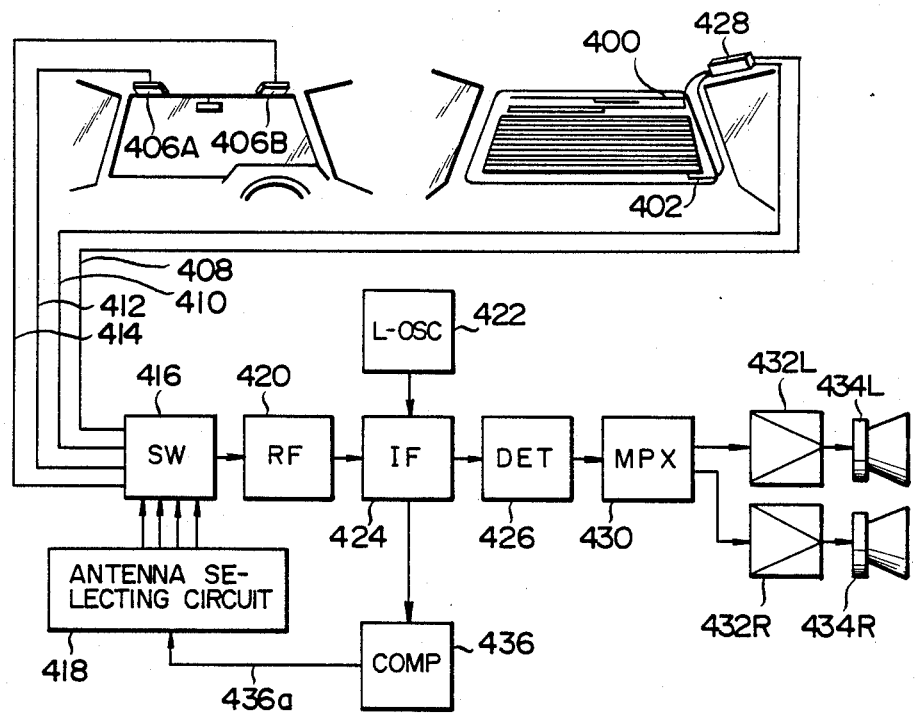
FIG. 28
(a) 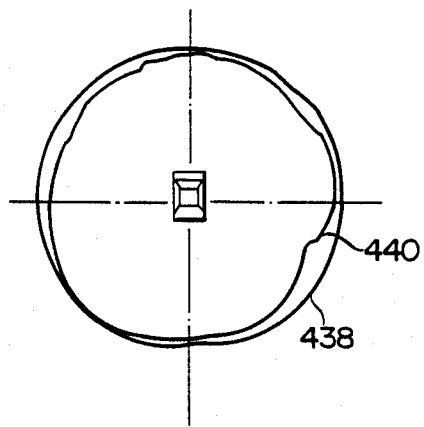
(b) 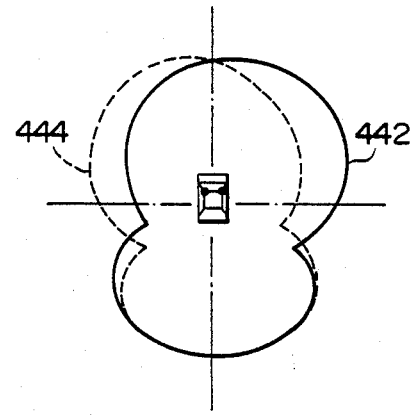

AUTOMOBILE ANTENNA SYSTEM

BACKGROUND OF THE INVENTION

1. Field of the Invention

The present invention relates to an automobile antenna system, and more particularly, to an automobile antenna system which performs diversity reception of broadcast waves by detecting using, a plurality of high-frequency pickups, the surface currents induced on the vehicle body by the broadcast waves.

2. Description of the Prior Art

Antenna systems are indispensable to automobiles which must positively receive various broadcast waves such as those for radio, television and telephone at the receivers located within the vehicle. Such antenna systems are also very important for citizen band transceivers. Therefore, such antenna systems play an important role in the communication equipment which will be installed as a factory-installed item in the future.

In particular, television (TV) sets are these days often installed in automobiles, and it has become increasingly important for such automobiles to have an automobile antenna system capable of positively receiving TV broadcast waves.

However, high-frequency waves in the VHFL0 band (90 to 108 MHz), VHFHi band (170 to 220 MHz), or UHF band (440 to 770 MHz), such as TV broadcast waves, have a strong tendency to suffer from rectilinear propagation, so that direct waves and other waves interfere with each other as a result of bouncing off buildings, hill sides or other obstacles and this phenomenon produces distortion. Furthermore, in the case of a vehicle which is parked, the disturbance created by the waves generated by passing vehicles can cause multipath noise such as momentary interruption of sound during the reception of the TV broadcast waves. An automobile antenna system having only a single antenna is unable to reduce such multipath noise during the reception of TV broadcast waves.

Furthermore, it is difficult to receive TV broadcast waves stably, even if only the sound of the TV broadcast is received, by a conventional pole antenna during the travel of a car, because, due to the directivity of the antenna, the receiving state of the antenna changes in correspondence with the change in direction from which the broadcast waves come, during the travelling of the automobile.

To solve this problem, a diversity-reception type automobile TV antenna system has been known, in which at least two antennas are disposed on the vehicle body at predetermined intervals so that receiving operation is taken over by the antenna which enjoys superior reception by automatic changeover, whereby the directivity of the antenna is improved and the amount of multipath noise is lowered.

However, a conventional antenna is generally a pole antenna which projects outwardly from the vehicle body, and although it is superior in performance in its own way, it always remains a nuisance from the viewpoint of vehicle body design.

Especially, when diversity reception is preformed by an automobile antenna system, a plurality of antennas are newly required. As a result, the aesthetic appearance of the automobile is disadvantageously damaged, and the receiving performance is greatly deteriorated by electrical interference between the antennas.

Another type of improved automobile antenna system for radio broadcast reception has been proposed which performs diversity reception system by a pair of rear quarter glass antennas consisting of antenna elements which are pasted to the glass of the rear quarter window (Japanese Patent Laid-Open No. 61509/1983).

In this automobile antenna system, the receiving operation is taken over by the antenna which enjoys superior reception, two antennas being disposed on the rear quarter glass to the right and the left.

In such a diversity reception system composed of a pair of rear quarter glass antennas, one can compensate for the other if the receiving state of the latter deteriorates with respect to the broadcast waves travelling in the lateral direction relative to the advancing direction of the vehicle. On the other hand, with respect to broadcast waves travelling parallel to the advancing direction of the vehicle, the two antennas cannot together compensate adequately for a deteriorated receiving state.

SUMMARY OF THE INVENTION

Accordingly, it is an object of the present invention to provide an automobile antenna system which is capable of effective diversity reception without damaging the aesthetic appearance of an automobile, thereby eliminating the above-described problems.

To achieve this aim, the present invention provides an automobile antenna system which receives broadcast waves by a plurality of antennas provided on the vehicle body and outputs which the receiving signal from the antenna which enjoys the optimum reception. The antenna system is composed of a pair of antennas disposed on the rear side windows on both sides of the vehicle body (hereinunder referred to as "glass antennas"), and a pair of high-frequency pickups disposed on both sides of the vehicle body apart from the glass antennas by a predetermined distance for effectively picking up high-frequency surface currents which are induced on a vehicle body by broadcast waves.

The above and other objects, features and advantages of the present invention will become clear from the following description of the preferred embodiments thereof, taken in conjunction with the accompanying drawings.

BRIEF DESCRIPTION OF THE DRAWINGS

FIG. 14 shows the directional patterns of the high-frequency pickup and the rear quarter glass antenna in the reception in the TV broadcasting frequency band;

FIG. 16 is a block diagram of a second embodiment of an automobile antenna system according to the present invention;

FIG. 17 shows the directional patterns of the respective high-frequency pickups in the second embodiment;

FIG. 21 is a block diagram of a third embodiment of an automobile antenna system according to the present invention;

FIGS. 24a and 24b are explanatory views of the directional patterns of the antennas in the TV band, wherein FIG. 24(a) illustrates the directional pattern of the first antenna, and FIG. 24(b) illustrates the directional pattern of the second antenna;

FIG. 25 is a schematic perspective view a fourth embodiment of an automobile antenna system according to the present invention, showing the mounting positions of the antennas provided on the rear window glass and the front roof edges;

FIG. 27 is a circuit diagram of an automobile antenna system;

FIG. 28a shows the directional pattern of the antenna provided on the rear window glass; and FIG. 28b shows the directional pattern of the antenna provided on the front roof edge.

DESCRIPTION OF THE PREFERRED EMBODIMENTS

Preferred embodiments of an automobile antenna system according to the present invention will be explained hereinunder with reference to the accompanying drawings.

FIGS. 1 to 9 illustrate a process for examining the distribution characteristics of high-frequency currents so as to ascertain the location at which an antenna system can operate most efficiently on the vehicle body of an automobile.

Figure 1:
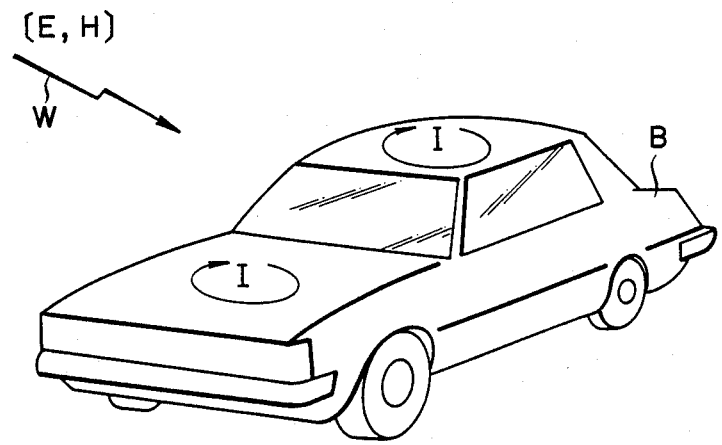
FIG. 1 is an explanatory view of the surface currents I produced on the vehicle body B by external TV broadcast waves W.

FIG. 1 shows that when external electromagnetic waves W, such as broadcast waves, pass through the vehicle body B of conductive metal, surface currents I are induced at various vehicle locations at levels corresponding to the intensities of electromagnetic waves passing therethrough. The present invention aims at only electromagnetic waves of relatively high frequency bands in excess of 50 MHz, such as FM broadcast waves and TV waves.

The present invention is characterized in that the distribution of the surface currents induced on the vehicle body by electromagnetic waves within the above-described particular wave bands is measured so as to seek a location on the vehicle body which is higher in surface current density and lower in noise and at which a pickup used in the present invention is located.

The distribution of surface currents is determined by a simulation using a computer and also by measuring actual intensities of surface currents at various locations on a vehicle body. In accordance with the present invention, the measurement is carried out by the use of a probe which can operate in accordance with the same principle as that of a high-frequency pickup actually located on the vehicle body at a desired location, as will be described later. Such a probe is moved on the vehicle body throughout the entire surface thereof to measure the level of surface currents at various locations of the vehicle body.

Figure 2:
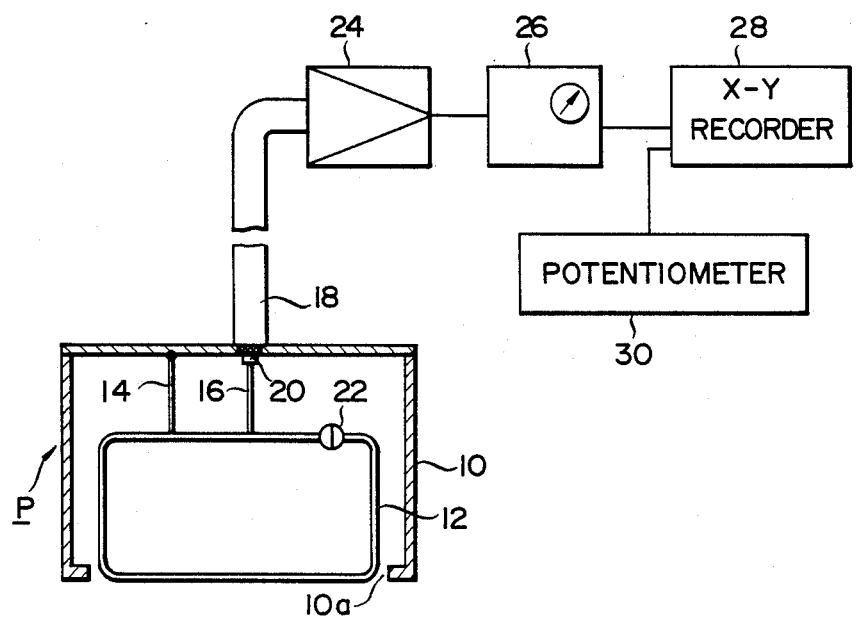
FIG. 2 illustrates a probe for detecting the distribution of surface currents on the vehicle body and having the same construction as that of the high-frequency pickup used in the present invention, and a circuit for processing signals from the probe.

FIG. 2 shows an example of such a probe P which is constructed in accordance with substantially the same principle as that of the high-frequency pickup described hereinafter. The probe P is composed of a casing 10 of electrically conductive material for preventing any external electromagnetic wave from transmitting to the interior thereof and a loop coil 12 fixed within the casing 10. The casing 10 includes an opening 10a formed therein through which a portion of the loop coil 12 is externally exposed. The exposed portion of the loop coil 12 is located in close proximity to the surface of the vehicle body B to detect magnetic flux induced by surface currents on the vehicle body B. Another portion of the loop coil 12 is connected with the casing 10 through a short-circuiting line 14. The loop coil 12 further includes an output end 16 connected with a core 20 in a coaxial cable 18. Still another portion of the loop coil 12 includes a capacitor 22 for causing the frequency in the loop coil 12 to resonate relative to the desired frequency to be measured to increase the efficiency of the pickup.

Thus, when the probe P is moved along the surface of the vehicle body B and also angularly rotated at various locations of measurement, the distribution and direction of surface currents can accurately be determined at each of the vehicle locations. In FIG. 2, the output of the probe P is amplified by a high-frequency voltage amplifier 24 and the resulting output voltage is measured by a high-frequency voltmeter 26. This coil output voltage is read at the indicated value of the high-frequency voltmeter 26 and also is recorded by an XY recorder 28 to provide the distribution of surface currents at various vehicle locations. The input of the XY recorder 28 receives signals indicative of various vehicle locations from a potentiometer 30 to recognize the value of high-frequency surface currents at the corresponding vehicle location.

Figure 3:
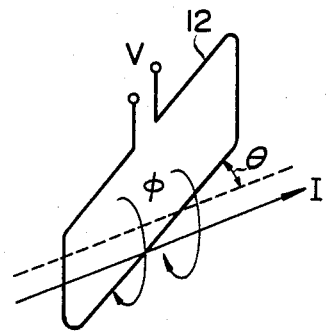
FIG. 3 illustrates the electromagnetic coupling between the surface currents I and the loop antenna of a pickup.
Figure 4:
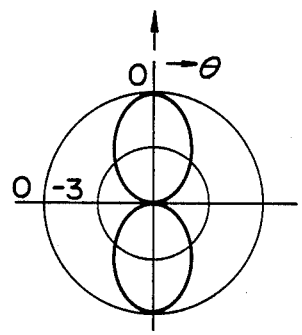
FIG. 4 illustrates the directional pattern of the loop antenna in FIG. 3.

FIG. 3 illustrates an angle $\theta$ of deflection between the high-frequency surface currents I and the loop coil 12 of the pickup. As is clear from the drawing, magnetic flux φ intersects the loop coil to generate a detection voltage V in the loop coil 12. As shown in FIG. 4, when the angle θ of deflection is equal to zero, that is, the surface currents I are parallel to the loop coil 12 of the pickup, the maximum voltage can be obtained. The direction of the surface currents I when the probe P is rotated to obtain the maximum voltage can also be known.

Figure 5:
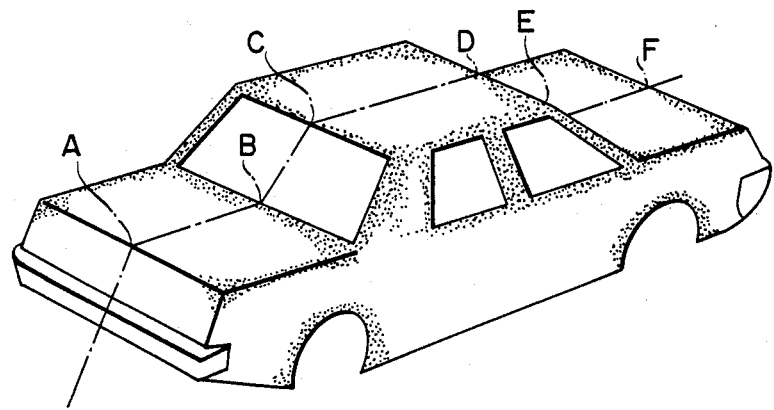
FIG. 5 illustrates the intensity distribution of the surface currents on the vehicle body.
Figure 6:
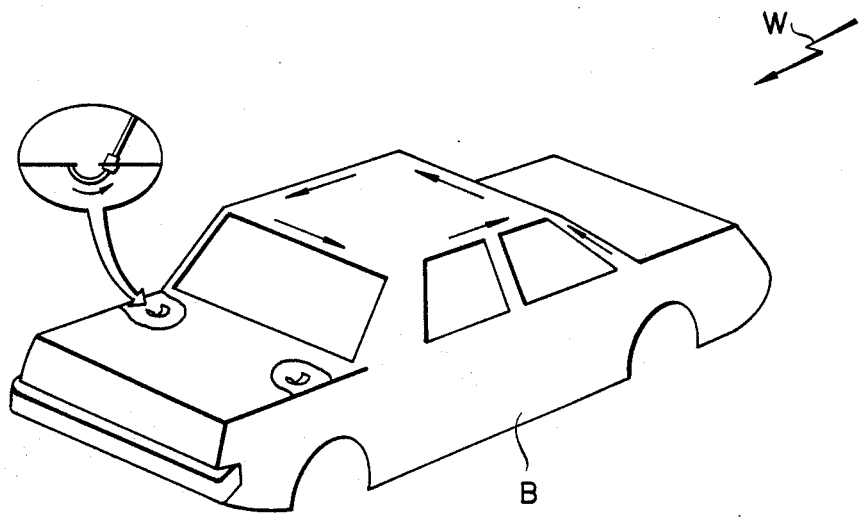
FIG. 6 shows the directions of the flow of the surface currents on the vehicle body.

FIGS. 5 and 6 respectively show the magnitude and direction of high-frequency surface currents induced at various different locations of the vehicle body at the frequency of 80 MHz, the values of which are obtained from the measurements of the probe P and the simulation effected by the computer. As is clear from FIG. 5, the distribution of surface currents has higher densities at the marginal edge of the vehicle body and lower densities at the central portion of the flat vehicle panels.

It will also be apparent from FIG. 6, that the surface currents are concentrated in the direction parallel to the marginal edge of the vehicle body or in the direction along the connections of various flat panels.

Figure 8:
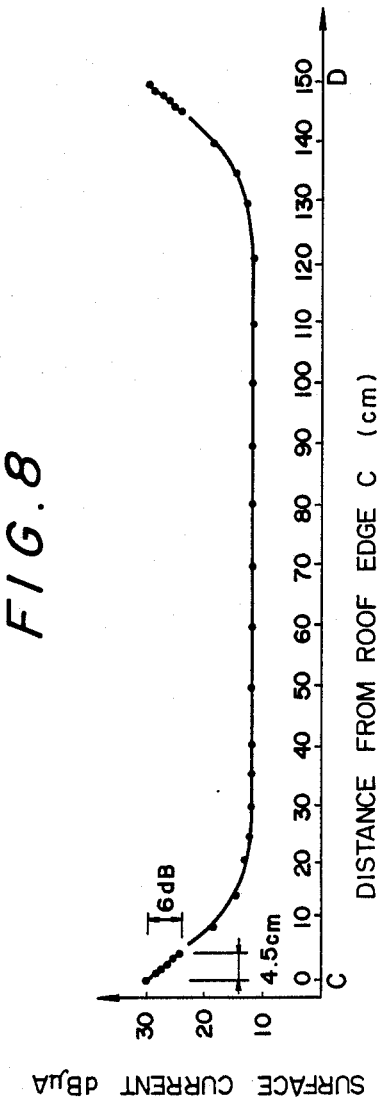
FIGS. 7, 8 and 9 show the distributions of the currents along the lines A-B, C-D, and E-F, respectively, of the vehicle body shown in FIG. 5.
Figure 9:
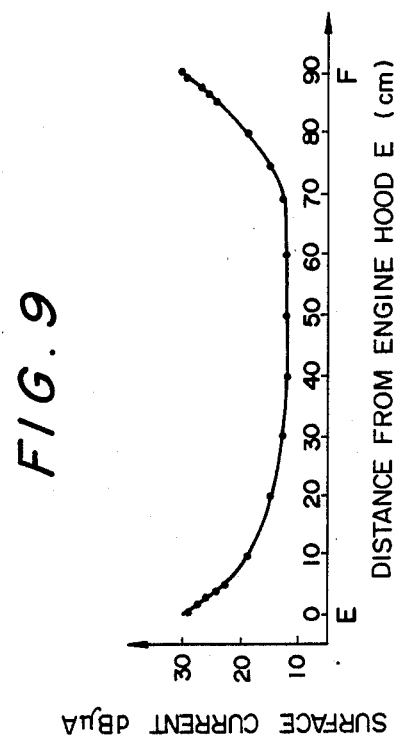
Figure 7:
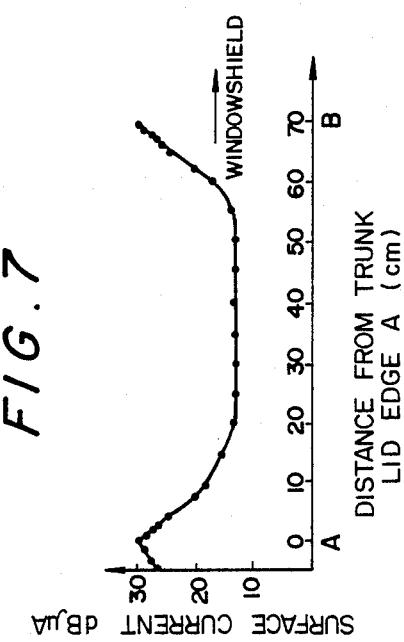

The distribution of the currents induced on the metal portions of the vehicle body shown in FIG. 5 is examined in detail with respect to what occurs along the broken lines shown, the resulting distribution characteristics are shown in FIGS. 7 to 9.

FIG. 7 shows the distribution of the surface currents along the trunk lid body, namely, the line A-B in FIG. 5. As is obvious from the curve, the largest currents flow at both end portions of the trunk lid and the value decreases toward the center of the trunk lid.

Accordingly, it will be understood from FIG. 7 that if a high-frequency pickup is disposed in the vicinity of the peripheral edge of the trunk lid, it is possible to detect the currents which flow concentratedly there. Similarly, FIG. 8 shows the distribution of the currents along the roof panel of the vehicle body and FIG. 9 shows the distribution of the currents along the engine hood body. As is clear from the graphs, the largest currents flow at both ends of the roof panel and the engine hood and the value of the current decreases toward the center thereof.

Thus, it will be understood that according to the present invention, it is possible to pick up broadcast waves with good sensitivity in the vicinity of each marginal edge portion of the vehicle body.

It goes without saying that the positions of the high-frequency pickups are not limited to the lid bodies and the roof panel but they may be the trunk hinges, pillars and fenders.

In the present invention, high-frequency pickups are longitudinally disposed in close proximity to the respective marginal edge portions of the vehicle body. In order to obtain very good sensitivity adequate for practical use, the pickup is preferably disposed apart from the edge at a distance which is within a range which depends upon the carrier frequency of the broadcast waves.

FIGS. 7 to 9 show the distribution characteristics of currents on the vehicle body with respect to FM broadcasts of 80 MHz. The value of the current decreases in correspondence with the distance from the edge of the vehicle body, as described above. Since the range under 6 db is the lower limit for currents in which good sensitivity is actually obtainable, it is understood that very good sensitivity may be obtained if the pickup is disposed within a distance of 4.5 cm from the peripheral edge.

Accordingly, in the present invention, if a high-frequency pickup is disposed within a distance of 4.5 cm inward of the peripheral edge of the vehicle body with respect to the carrier frequencies of 80 MHz, an antenna system adequate for practical use is obtained.

It is found from the computer's simulation and various experimental measurements that the distance between the position where high-frequency pickup is mounted and the marginal edge of the vehicle body and the distance which is suitable for practical use depends upon the carrier frequency used therein. It is also recognized that the distance is decreased as the value of the carrier frequency is increased.

From the fact that the suitable distance of 4.5 cm from the corresponding marginal vehicle portion is inversely proportional to the value of the carrier frequency, good results can be obtained relative to the respective values of the carrier frequency if the high-frequency pickup is spaced away from the metal plane peripheral edge of the vehicle body within a distance represented by the following formula:

$$12 \times 10^{-3} c/f(m)$$

wherein c=the velocity of light and f=carrier frequency.

As described above, according to the present invention, the high-frequency pickup is provided in close proximity to the peripheral edge portion of a metal vehicle body and preferably within th eabove-described distance from the peripheral edge, whereby good receiving operation is ensured.

In the present invention, since that distance suitable for practical used depends upon the carrier frequency, if, for example, the carrier frequency is 100 MHz, a high-frequency pickup is disposed within a distance of 3.6 cm inward of the peripheral edge of the vehicle body, and with the increases of the carrier frequency f, the position the high-frequency pickup is disposed is limited to a narrow range which is very close to the edge portion of the vehicle body.

First Embodiment

In a first embodiment, high-frequency pickups 36A, 36B of the second pair of antennas which are incorporated in the diversity antenna system are disposed on the edge of the front windshield which are very close to the peripheral edge portions of the roof panel, such that longitudinal directions of, e.g., respective loop antennas agree with the longitudinal direction of edge of the front windshield. Each of the pickups is preferably disposed apart from the edge at a distance which is within a range which depends upon the carrier frequency of the broadcast waves.

Figure 10:
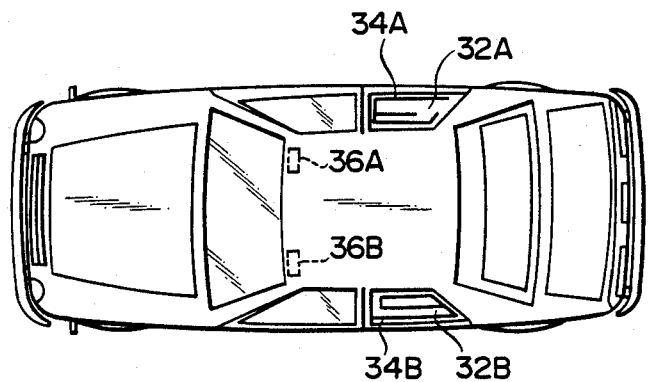
FIG. 10 shows the arrangement of the antennas of a first embodiment of an automobile antenna system according to the present invention.

In FIG. 10, the first pair of antennas incorporated in the diversity antenna system are provided on the right and left side windows of the vehicle body, for example, on the rear quarter glasses 32A, 32B. The first pair of antennas consists of rear quarter glass antennas 34A and 34B which are pasted on the rear quarter glasses 32A, 32B.

The high-frequency pickups 36A, 36B of the second pairs of antennas which constitute the diversity antenna are mounted on the edge of the front windshield on both sides (not shown).

Figure 11:
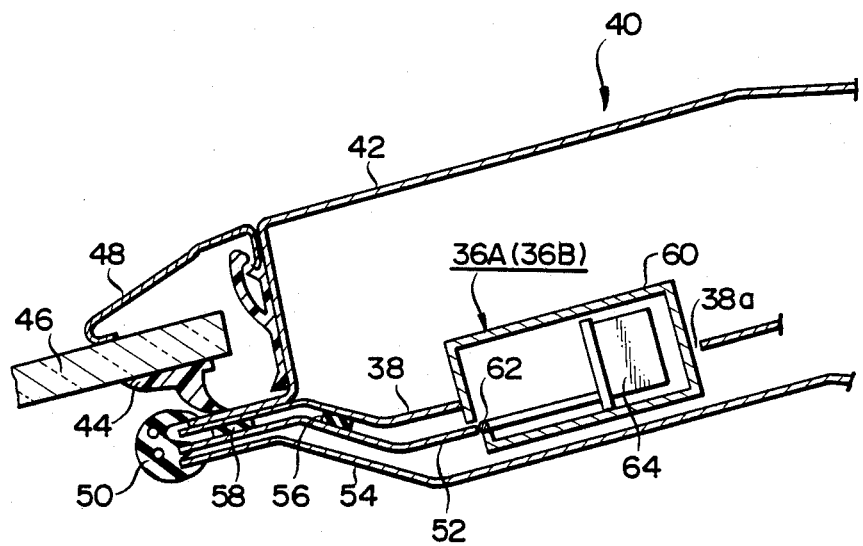
FIG. 11 shows a high-frequency pickup shown in FIG. 10, in the mounted state.

FIG. 11 is a cross sectional view of the high-frequency pickups 36A, 36B constituting the diversity antenna which is disposed on a roof panel 40 at the front portion of the vehicle body. The high-frequency pickups 36A, 36B are mounted on the edge of the front windshield and are inserted into a service hole 38a of the header inner panel 38.

A front windshield glass 46 is secured to the roof panel 44 through a dam 44, and a molding 48 is fixed between the roof panel 42 and the front windshield glass 46.

An edge molding retainer 52 on which an edge molding 50 is mounted is provided between the header inner panel 38 and a roof garnish 54. The edge molding retainer 52 is separated from the header inner panel 38 by spacers 58, thereby promoting the concentration of surface currents.

A casing 60 accommodates a loop antenna 62 and circuitry 64, whereby the magnetic flux induced by the high-frequency surface currents which are flowing in the peripheral edge portion of the header inner panel 38 is positively detected by the loop antenna 62 in the casing 60, and is safely shielded from external electromagnetic waves by the casing 60. Thus, it is possible to detect the currents induced on the vehicle body with good sensitivity by the high-frequency pickups 36A, 36B.

In this embodiment, the side of the loop antenna which protrudes from the casing 60 is disposed within a distance of 4.5 cm from the peripheral edge of the retainer 52, whereby the surface currents induced on the vehicle body by the broadcast waves in the TV frequency band of more than 50 MHz are detected. Since the surface currents on the vehicle body flow along the marginal edge portions thereof, as is clear from FIG. 6, the longitudinal direction of the loop antenna 62 in this embodiment is disposed along the peripheral edge of the retainer 52.

The structure of the circuit in which broadcast waves are received by the pickup enjoying superior reception which is automatically selected from among the pickups 36A, 36B will now be explained with reference to FIG. 12.

The receiving signals of the pair of high-frequency pickups 36A, 36B and the pair of rear quarter glass antennas 34A, 34B are input into a switching circuit 68 by coaxial cables 66-1 to 66-4.

The receiving signals of the rear quarter glass antennas 34A, 34B are amplified by amplifiers 70A, 70B.

The switching circuit 68 performs changeover among these high-frequency pickups 36A, 36B and the rear quarter glass antennas 34A, 34B which are used for receiving TV broadcast waves, by selecting a signal from those output by these pickups 36A, 36B and rear quarter glass antennas 34A, 34B and outputting it to a tuner 72.

The tuner 72, which selects a channel when it receives the receiving signal, is composed of a known circuit, namely, high-frequency amplifier 74, a local oscillator 76 and a mixer 78.

After channel selection by the tuner 72, the receiving signal is amplified by a video intermediate signal amplifier 80 and is output to a video display circuit 82 and a sound output circuit 84.

The video display circuit 82 has a known structure, namely, it is composed of a video detection circuit 86, a synchronizing deflection circuit 92 which is connected to a deflection circuit of a cathode-ray tube 90 through a vertical deflection and horizontal deflection circuitry, and a chromaticity circuit 94.

A video signal is detected by the video detection circuit 86 and amplified by the video amplifier 88, and thereafter it is displayed on the cathode-ray tube 90.

The sound output circuit 84 in this embodiment has also a known structure, namely, it is composed of a sound separation circuit 96, a sound intermediate frequency amplifier 98, a sound detection circuit 100 and a sound amplifier 110. The sound signal is separated from the signal output by the video intermediate frequency amplifier 80 and is detected to be output by a speaker 112.

In this manner, the automobile TV in this embodiment separates the receiving signal into the video signal and the sound signal, and displays the video signal on the cathode-ray tube 90 and outputs the sound signal from the speaker 112.

The antenna system in this embodiment includes a driving state judgement circuit 114 and a switch 116 which is provided between the video detection circuit 86 and the video amplifier 88 so as to turn on and off the video signal. When the driving state judgement circuit 114 detects that the vehicle is stationary, it turns the switch 116 on, while when it detects that the vehicle is running it turns the switch 116 off.

Figure 13:
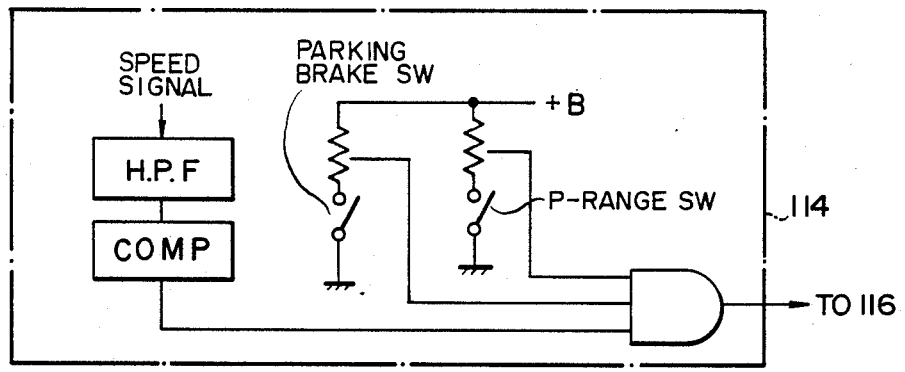
FIG. 13 is a circuit diagram illustrating in detail the drive state judgement circuit shown in FIG. 12.

FIG. 13 shows the circuit structure of the driving state judgement circuit 114. When both a parking position switch and a hand brake switch are on, and the vehicle speed is below a predetermined value, the circuit in this embodiment judges the vehicle is in the parking mode, and a high-level signal is output from an AND gate to turn the switch 116 on. In the other cases, the circuit judges that the vehicle is in the running mode, and a low level signal is output from the AND gate to turn the switch 116 off.

The vehicle speed is detected by inputting a vehicle speed detection pulse into a comparator through a high pass filter and comparing thereby the pulse with a predetermined reference value.

Therefore, in the antenna system in accordance with this embodiment, when the vehicle is stationary, the switch 116 is on and therefore a picture is displayed on the cathode-ray tube 90, and sound is output from the speaker 112. On the other hand, when the vehicle is running, the switch 116 is off, and therefore no picture is displayed on the cathode-ray tube 90 and sound alone is output from the speaker 112.

In this way, the antenna system in this embodiment only outputs sound from the speaker during travel of the vehicle, thereby preventing the attention of the driver from being distracted by the picture displayed on the cathode-ray tube 90 when driving.

In such an automobile TV antenna system, since the receiving state of the antenna changes during travel of the vehicle, a diversity reception system is adopted in order to obtain a good picture and sound. In this diversity reception system, the receiving operation is taken over by automatic changeover, in correspondence with a change in the receiving state of waves, by the optimum antenna among the high-frequency pickups 36A, 36B and the rear quarter glass antennas 34A, 34B which enjoys the best reception.

The switching circuit 68 for switching antennas changes the present antenna to the antenna which enjoys the optimum reception by an antenna switching circuit 118 which produces a switching signal 118a when the output of the video detection circuit 86 is lowered below a predetermined level. It is also possible to switch the antenna on the basis of a sound detection output.

It is also possible to switch antennas during the flyback period with the antenna switching timing synchronized with a horizontal synchronizing signal 98a.

Referring to FIG. 14a, the directional characteristic of a rear quarter glass antenna 34A pasted on the rear quarter glass in the TV band is shown. As is clear from the drawing, it exhibits high sensitivity in the righthand direction with respect to the position where the antenna is mounted.

As is shown in FIG. 14b, the directional characteristic of the high-frequency pickup 36A mounted close to the edge of the front windshield in the TV band exhibits high sensitivity in the backward and forward direction of the vehicle body.

Accordingly, the diversity antenna in accordance with the present invention, which consists of the pair of high-frequency pickups 36A, 36B disposed close to the edge of the front windshield on the right and lefthand sides, and the pair of rear quarter glass antennas 34A, 34B which are pasted on the rear quarter glasses 32A, 32B, is able to improve, as a whole, the directional characteristics of the antenna in the reception of the TV broadcast frequency band.

The distance between the antennas on the right and lefthand sides is about 1.5 m, and that between those at the front and the rear of the vehicle body is about 2 m. Therefore, these antennas in combination constitute a very effective space diversity antenna system.

Additionally, in order to level up the receiving sensitivity with respect to TV broadcast waves in a vehicle in which rear quarter glass antennas are installed as a factory-installed item, it suffices to mount a pair of high-frequency pickups close to the edge of the front windshield edge, namely, the retainer thereof.

Second Embodiment

Figure 15:
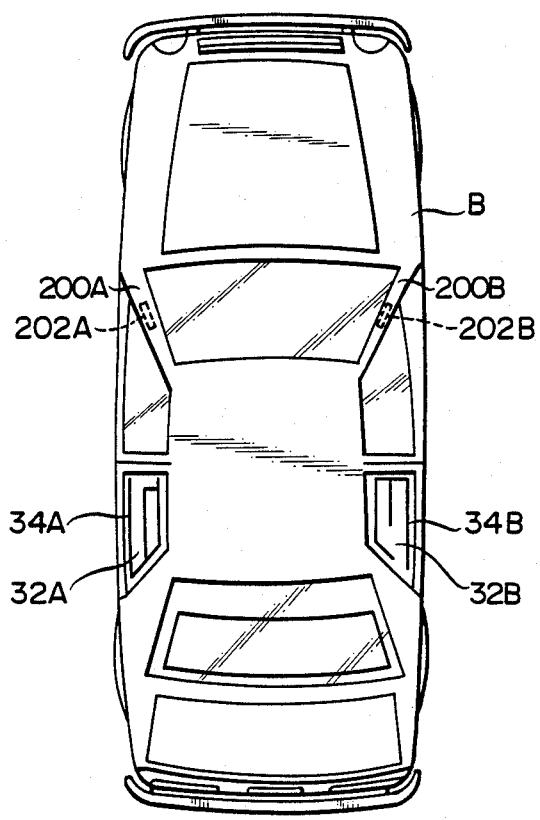
FIG. 15 is an explanatory view of the arrangement of the glass antennas and the high-frequency pickups with respect to the vehicle body.

A second embodiment of an antenna system according to the present invention is shown in FIGS. 15 and 16.

This embodiment is characterized in that the the glass antennas 34A, 34B are disposed on the rear quarter glasses 32A, 32B on both sides of the vehicle body, and high-frequency pickups 202A, 202B having a similar structure to the above-described probe are disposed on the front pillars 200A, 200B, so that these two glass antennas 34A, 34B and two high-frequency pickups 202A, 202B in combination constitute a space diversity antenna.

It is known that antennas for a space diversity reception system can ordinarily obtain space diversity effects which are adequate for practical use if the distance between them is more than λ/4 to λ/2, wherein λ represents wavelength. It will be understood that since the distance between the high-frequency pickups 202A and 202B placed on the front pillars on both sides is about 1.5 m, and the distance between the high-frequency pickups 202A placed on the front pillar and the glass antenna 34A pasted on the rear quarter glass 32 is about 2 m, and the wavelength of the TV broadcast waves is about 3.5 m or less, this embodiment provides a very effective space diversity reception antenna system for such TV broadcast frequency band.

The structure of the circuit in which broadcast waves are received by the pickup enjoying the best reception which is automatically selected from among the glass antennas 34A, 34B, and the high-frequency pickups 36A and 36B are shown in FIG. 16. The same numerals are provided for those elements which are the same as those shown in FIG. 12, and explanation thereof will be omitted.

FIGS. 17a and 17b illustrate the directional patterns of antennas in the TV broadcast frequency band. In FIG. 17a, the high-frequency pickup is mounted on the righthand front pillar, while in FIG. 17b, the glass antenna is mounted on the rear quarter glass on the righthand side.

The directional pattern of the high-frequency pickup which is mounted on the righthand front pillar is approximate to the configuration of the numeral 8, as is clear from the characteristic curve in FIG. 17a, and no sudden drop of output level is seen. Therefore, it will be understood that the high-frequency pickup on the righthand front pillar effectively compensates for the glass antenna 34B on the rear quarter glass on the same side which has the directional characteristic shown by the curve in FIG. 17b, namely, one which has a large level drop in the forward and lefthand direction of the vehicle body.

As described above, according to this embodiment, the best possible reception of TV waves is enabled by the diversity reception using the glass antennas provided on the rear quarter glasses on both sides of the vehicle body and the high-frequency pickups provided on the front pillars, and thereby compensating together for any deterioration of sensitivity.

An example of attachment of the high-frequency pickups to the front pillars will be explained with reference to FIGS. 18 to 20.

Figure 18:
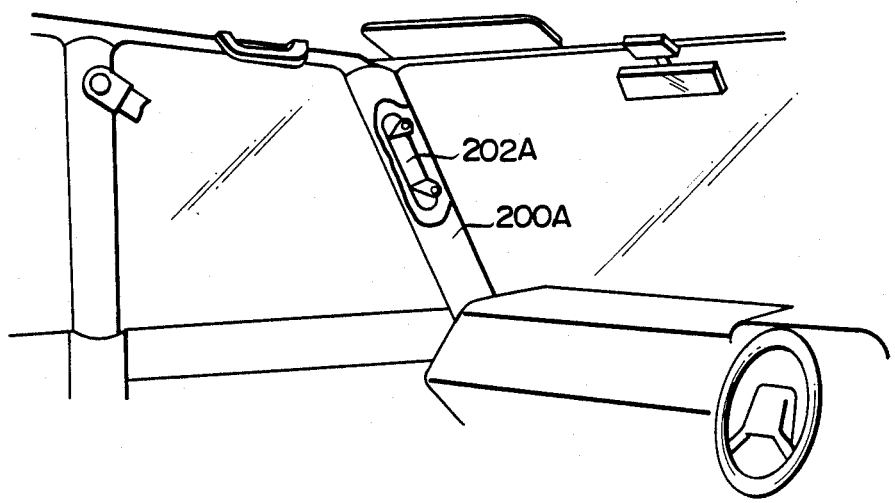
FIG. 18 schematically shows the arrangement of a high-frequency pickup in accordance with this embodiment.

In FIG. 18 the schematic structure of the antenna system according to the present invention is shown. The high-frequency pickup 202A is accommodated in the front pillar 200A for supporting the roof panel. In the embodiment, the high-frequency pickup 202A consists of an electromagnetic type pickup which includes a loop coil.

Figure 19:
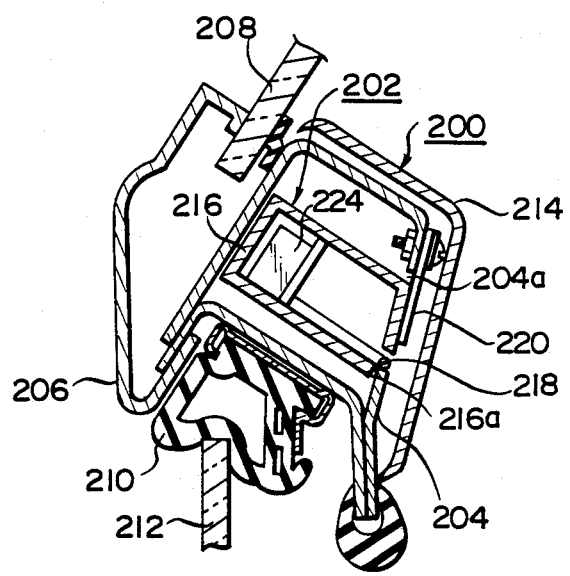
FIG. 19 is a cross sectional view of an electromagnetic coupling type high-frequency pickup which is mounted on the front pillar.

As is clear from the sectional view of FIG. 19, the pillar 200 includes a pedestal plate 204 which serves as the main pillar and has a configuration of a hollow prism. A windshield molding 206 is secured to the surface of the pedestal plate 204 which faces the exterior of the vehicle body, and the molding 206 retains a front windshield glass 208.

A weather strip rubber 210 is secured to the surface of the pedestal plate 204 which faces the rear portion of the vehicle body, thereby maintaining the water-sealed state of the joint between a side window glass 212 and the pedestal plate 204.

A front pillar garnish 214 is mounted on the surface of the pedestal plate 204 which faces the interior of the vehicle body to enclose the surface of the pedestal plate 204, thereby maintaining the aesthetically pleasing appearance of the vehicle body.

This embodiment is characterized in that a high frequency pickup is longitudinally disposed on the front pillar 200, and in the example shown in FIG. 19, the high-frequency pickup 202 of electromagnetic coupling type is inserted into the hollow portion of the pedestal plate 204.

Figure 20:
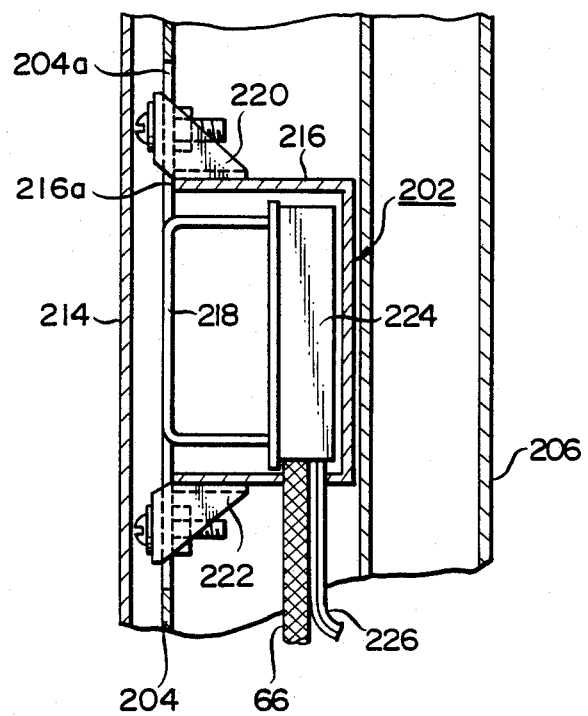
FIG. 20 is the cross sectional view of the main part of the pickup shown in FIG. 19.

The high-frequency pickup 202 is composed of a casing 216 of a conductive material and a loop coil 218 which is provided within the casing 216 and constitutes an antenna element, as is obvious from FIGS. 19 and 20. The casing 216 for shielding the loop coil from an external electromagnetic field is provided with an opening 216a at one side thereof. The loop coil 218 is exposed from the opening 216a and is disposed in proximity to the pillar where high-frequency surface currents flow concentratedly, in particular, to the pedestal plate 204.

In order to insert the high-frequency pickup 202 into the hollow prism of the pillar pedestal 204, an opening 204a is provided on a part of the pillar pedestal 204. The high-frequency pickup 202 is inserted into the pillar before the front garnish 214 is fixed. In order to secure the casing 216 of the high-frequency pickup 202 to the pedestal plate 204, brackets 220, 222 are fixed to both sides of the casing 216 by spot welding or the like, and the brackets 220, 222 are tightly screwed to the pedestal plate 204.

Accordingly, the loop coil 218 in this fixed state is disposed in the vicinity of the opening portion 204a of the pedestal plate 204, whereby the magnetic flux induced by the surface currents which flow concentratedly on the pedestal plate 204 effectively intersect the loop coil 218.

A circuitry 224 including a pre-amplifier and the like is housed behind the loop coil 218 in the casing 216. A power source and a signal for controlling the circuit is supplied from a cable 226 to the circuitry 224, and the high-frequency detection signal fetched by the loop coil 218 is fetched outward from a coaxial cable 66 and is processed by a circuit similar to that used for examining distribution of surface currents.

The loop coil 218 is in the from of a single wound coil which is covered with insulation so that the coil can be arranged in an electrically insulated relationship with and in close contact with the pedestal plate 204. Preferably the loop coil 218 is attached to the peripheral edge of the pedestal plate 204. Thus, the magnetic flux induced by the surface currents concentratedly flowing on the pedestal plate 204 can intersect the loop coil 218 with good efficiency.

After the high frequency pickup 202a is inserted into the front pillar 200 in this way, the front pillar 200 is covered with the front pillar garnish 214. Thus, the structure of the front pillar 200 is perfectly the same as an ordinary pillar in terms of external appearance.

As a result, the high-frequency surface currents which are concentrated and flow on the front pillar are detected with good efficiency by the loop coil which is longitudinally provided there, thereby ensuring reception in the high-frequency bands without any external exposure of the antenna system.

Although an electromagnetic coupling type pickup is used as the high-frequency pickup in this embodiment, since this embodiment is characterized by detection of the surface currents on the pillars for reception of external waves, an electrostatic coupling type pickup is also usable as the high frequency pickup as well as the electromagnetic type pickup.

When an electrostatic coupling type pickup is used, a detection electrode is longitudinally disposed on the pillars in FIGS. 18 to 20 through an air layer or an insulation layer, and a high-frequency signal is fetched to the detection electrode side through the electrostatic capacity formed between the surface of the pillar and the detection electrode, thereby making it possible to fetch a high-frequency signal in a desired band.

Additionally, since the high-frequency pickups in accordance with this embodiment are readily attached to a vehicle body as an optional item, it is possible to improve the receiving sensitivity of the antenna in a vehicle in which rear quarter glass antennas are installed as a factory-installed item.

Third Embodiment

Figure 22:
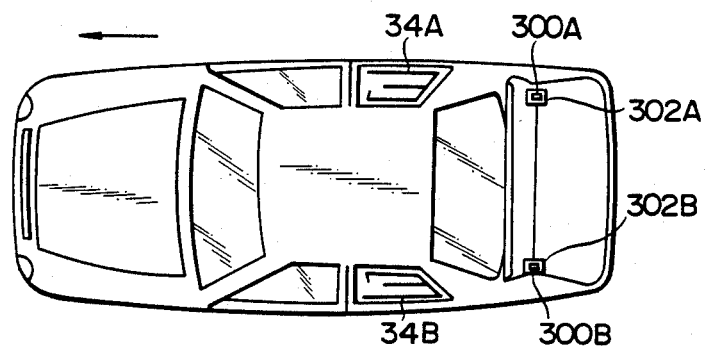
FIG. 22 shows the arrangement of the first and second antennas of the third embodiment.

FIG. 21 shows a third embodiment of an automobile antenna system according to the present invention, and FIG. 22 illustrates the arrangement of the four antennas which constitute a diversity antenna in accordance with the present invention.

This embodiment is characterized in that a combination of a first pair of antennas which are mounted on the side windows on both sides of the vehicle body and a second pair of antennas which consist of high-frequency pickups mounted on the right and left trunk hinges constitute a diversity antenna, whereby the sensitivity of the antenna is enhanced in the longitudinal as well as in the lateral direction of the vehicle body.

In FIG. 22, the first antenna 34 is pasted on the rear quarter glass 32 of a side window, and the second antenna 300 consists of a high-frequency pickup which is mounted on a trunk hinge 302. The first antennas 34 and the second antennas 300 are provided in pairs at the respective opposite positions on both sides of the vehicle body, as shown in FIG. 22.

In this way, the high-frequency pickup 300 in this embodiment is mounted on the trunk hinge 302, where the same or a larger concentration of surface currents flow in comparison with the other portions, as shown in FIG. 5. This tendency increases as frequency gets higher, and detection of the surface currents induced on the vehicle body is therefore enabled, this having been considered impossible in the AM band.

Since the trunk hinge 302 is distant from the engine, the pickup disposed there is not susceptible to noise from the vehicle body, thereby enabling a current detection value with a good SN ratio to be obtained.

Figure 23:
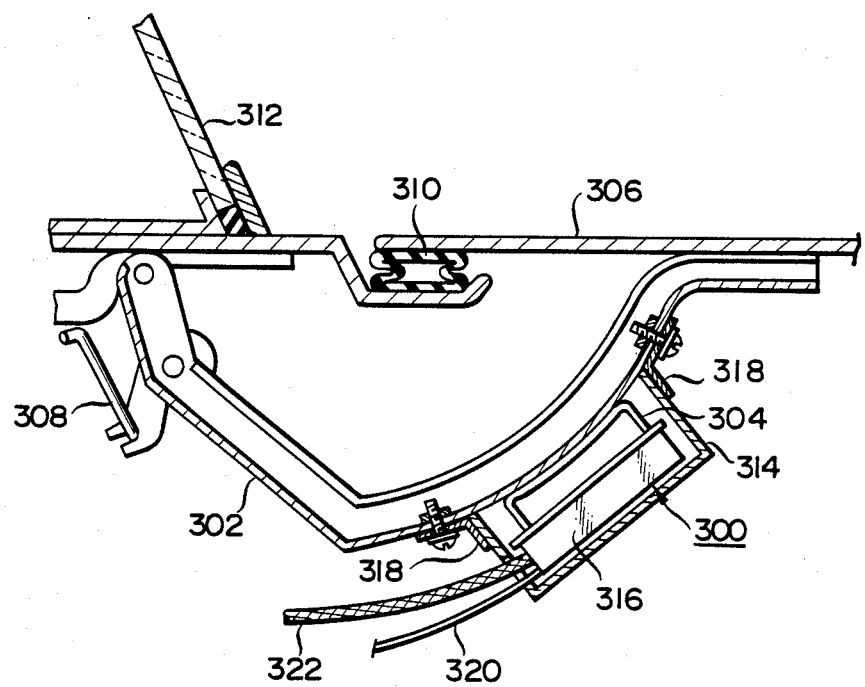
FIG. 23 is a cross sectional view of a high-frequency pickup constituting the second antenna.

FIG. 23 shows the second antenna 300 in the mounted state. In this embodiment the second antenna 300 consists of an electromagnetic type high-frequency pickup and includes a loop antenna 304 for detecting the surface currents on the vehicle body.

The trunk hinge 302 with one end thereof rotatably supported by the vehicle body and the other end secured to a trunk lid 306 rotatably supports the trunk lid 306. A torsion bar 308 provided on the end of the trunk hinge 302 which is rotatably supported by the vehicle body controls the opening degree of the trunk lid 306 when it is open. As is known, a water sealing weather strip 310 is provided between the trunk lid 306 and the vehicle body, thereby preventing rainwater from entering from a rear window glass 312.

In this embodiment, the second antenna 300 is longitudinally fixed on the outer surface of the trunk hinge 302, namely, on the side facing the trunk void, in such a manner that the longitudinal side of a loop antenna 304 provided within the second antenna 300 is disposed in parallel to the longitudinal side of the trunk hinge 302. In this way, the loop antenna 304 can positively detect the surface currents flowing on the trunk hinge 302 with high efficiency.

The second antenna 300, namely, the high-frequency pickup, includes a casing 314 formed of a conductive material. The casing 314 is provided with the loop antenna 304 and a circuitry 316 containing a pre-amplifier and the like therewithin, and the opening side of the casing 314 is opposed to the trunk hinge 302. L-shaped fitting metals 318-1, 318-2 are secured to both open end portions of the casing 314, and one end of each of the L-shaped fitting metals 318-1, 318-2 is firmly screwed to the trunk hinge 302. Therefore, it will be understood that the magnetic flux alone which is induced by the high-frequency surface currents flowing on the trunk hinge 302 is introduced into the casing 314, and safely shielded from external magnetic flux by the casing 314. The loop antenna 304 is preferably provided along the trunk hinge 302, and is formed in conformity with the curvature of the trunk hinge 302. Power source and a signal for controlling the circuit are supplied to the circuitry 316 from a cable 320, and the high-frequency detection signal fetched by the loop antenna 304 is fetched outward by a coaxial cable 322, and is processed by a similar circuit to that which is used for the detection of the distribution of the surface currents (FIG. 2).

The loop antenna 304 is in the from of a single wound coil which is covered with insulation so that the coil can be arranged in an electrically insulated relationship with and in close contact with the trunk hinge 302. Thus, the magnetic flux produced by the surface currents can intersect the loop antenna 304 with good efficiency.

It is also possible to attach the second antenna 300 to the back of the trunk hinge 302, as described above, thereby preventing it from coming into contact with the baggage or the like placed within the trunk void.

Figure 12:
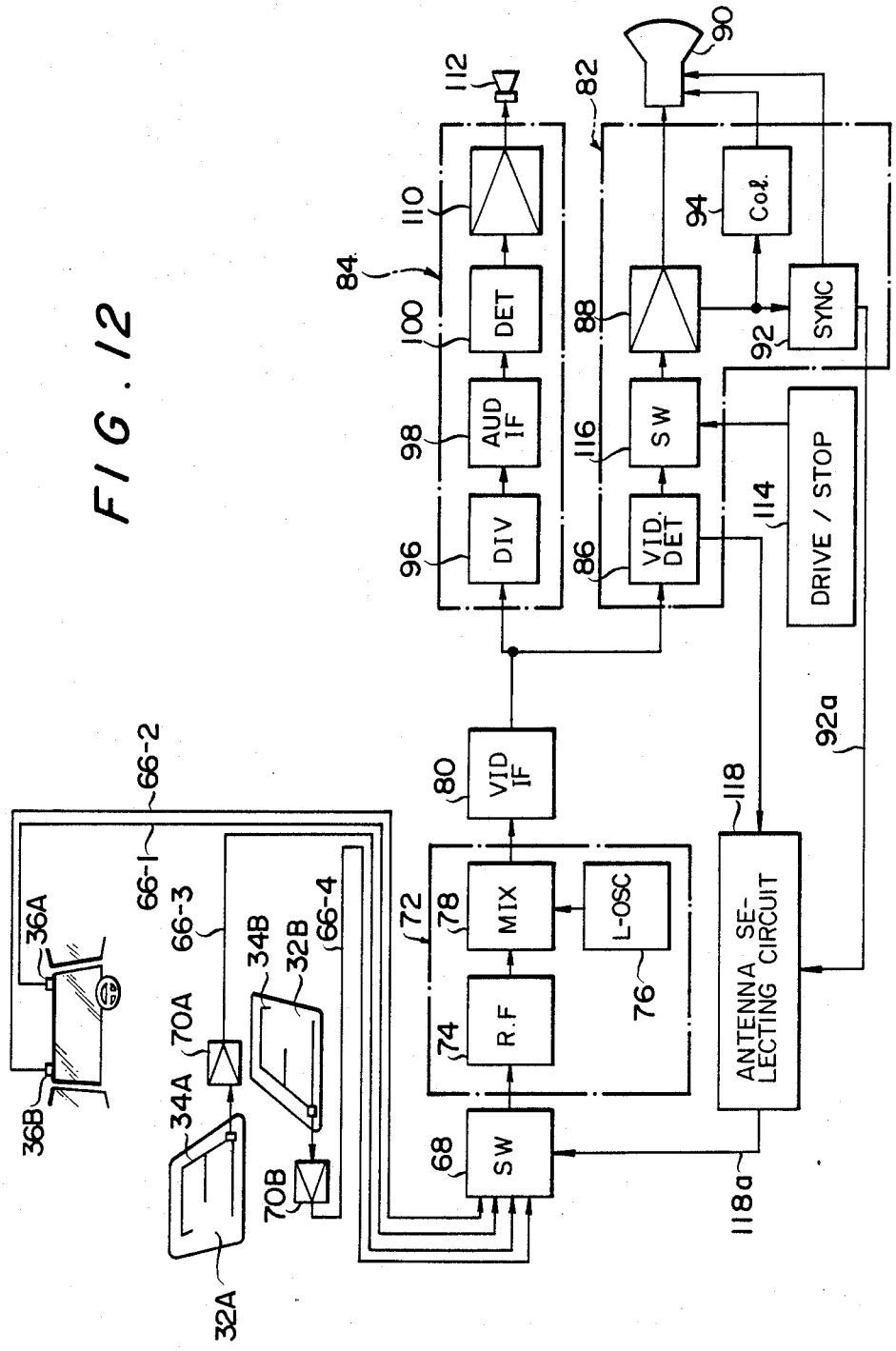
FIG. 12 is a circuit diagram of the entire structure of a diversity reception system composed of a pair of high-frequency pickups and a pair of rear quarter glass antennas.

Since the circuit shown in FIG. 21 is approximately the same as that shown in FIG. 12, the same numerals are provided for those elements which are the same as those in FIG. 12 and explanation thereof will be omitted.

In this manner, TV broadcast waves are always received in the optimum state by the antenna selected as being the one enjoying the best possible reception. FIGS. 24a and 24b illustrate the directional patterns of the first and second antennas in accordance with the embodiment. FIG. 24a shows the directional characteristic of the first antenna 34 and FIG. 24b that of the second antenna 300, which is the high-frequency pickup.

As is obvious from the characteristic curves, the first antenna 34 and the second antenna 324 exhibit similarly high sensitivity in the longitudinal direction of the vehicle body. Accordingly, a combination of the two pairs of antennas, each of which are opposed to each other on the right and left sides of the vehicle body, can enhance the space diversity effect, in particular, that occurring in the longitudinal direction of the vehicle body.

The first antenna 34 and the second antenna 300 can deal with a change in broadcast waves travelling in the lateral direction of the vehicle body such as, for example, a change caused by multipath noise during travel of the vehicle, or a change caused by the disturbance of passing vehicles. Even if the level of one antenna is lowered, the other antenna having the same directional pattern is able to completely restore the receiving level to the original one.

Although an electromagnetic coupling type pickup is used as the second antenna 300, the high-frequency pickup, in this embodiment, an electrostatic coupling type pickup is also usable. When an electrostatic coupling type pickup is used, a detection electrode is longitudinally disposed on the trunk hinge 302 through an air layer or an insulation layer, and a high-frequency signal is fetched to the detection electrode side through the electrostatic capacity formed between the surface of the trunk hinge 302 and the detection electrode.

Fourth Embodiment

FIG. 25 shows a fourth embodiment of the present invention. In this embodiment, a pair of antennas are disposed both on the rear window glass and the front roof edge, thereby constituting a diversity reception antenna.

A first pair of antennas disposed on the rear window glass consists of glass antennas 400, 402. The glass antennas 400, 402 are disposed on upper and lower positions, respectively, of the rear window by pasting or the like.

A second pair of antennas provided on the front roof edge consist of electromagnetic type high-frequency pickups 406A, 406B, which are attached to right and left positions, respectively, of the front roof edge.

The attachment of the high-frequency pickup 406 constituting the second high-frequency pickup to the roof panel of the vehicle body is the same as that shown in FIG. 11, explanation thereof being omitted.

Figure 26:
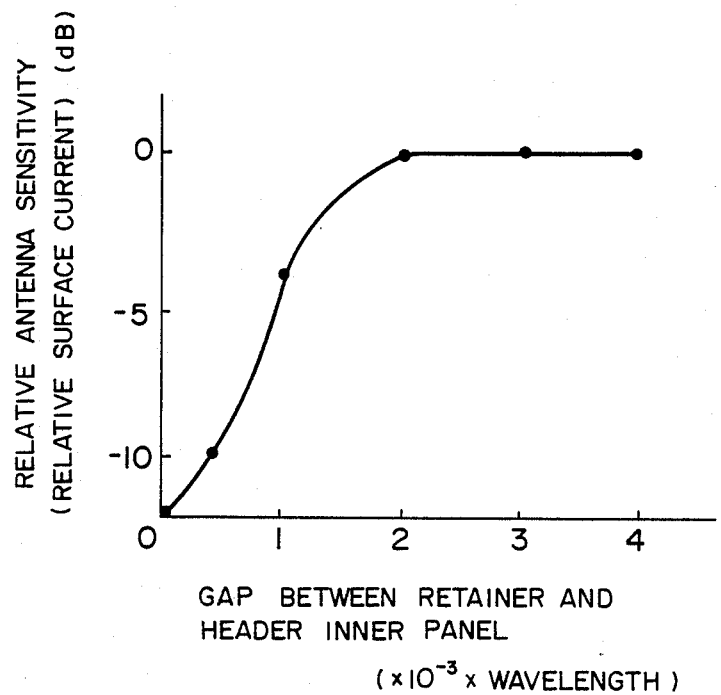
FIG. 26 shows a change in relative antenna sensitivity with respect to the space between the header inner panel and the retainer.

FIG. 26 shows a change in the relative sensitivity of the antenna, namely, a change in the density of surface currents in relation to the space between the header inner panel 38 and the retainer 52. As is clear from the graph, the density of surface currents reaches the maximum value when the space is equivalent to the $2 \times 10^{-3}$ wavelength. Therefore, it is possible to enhance the degree of concentration of the surface currents flowing on the marginal edge portion of the vehicle body by disposing the retainer 52 at a position about that distance apart from the header inner panel 38.

The structure of the circuit in which broadcast waves are received by the pickup enjoying the best reception which is automatically selected from among the high-frequency pickups 406A, 4406B and the glass antennas 400, 402 will now be explained with reference to FIG. 27.

Coaxial cables 408, 410, 412, 414 led out of the pairs of antennas provided on the rear window glass 404 and the front roof edge of the vehicle body are connected to a switching circuit 416. When the switching circuit 416 is switched by the output from a state switching circuit 418 which will be described later, a signal selected from the signals of the first and second pairs of antennas is input to a high-frequency amplifier 420, and the received wave passes through an intermediate frequency amplifier 424 which is connected to a local oscillator 422, and a sound signal is fetched by a detection circuit 426.

The roof is provided with an impedance matching unit 428 for the glass antennas 400, 402.

The sound signal is separated into the righthand output and the lefthand output through a multiplexer 430, and they are transmitted to speakers 434R, 434L through amplifiers 432R and 432L, respectively, on the right and lefthand sides.

The level of the output signal from the intermediate frequency amplifier 424 is compared by a comparator 436, in which is set the level value of a signal which is to be output from the intermediate frequency amplifier 424 when the receiving sensitivity of the respective antenna is degenerated below a predetermined value. The comparator 436 compares the signal output from the intermediate frequency amplifier 424 with the level value, and when the signal is below the level value, a trigger signal 436a is delivered to the state switching circuit 418 to invert the output of the state switching circuit 418.

The inversion of the output switches the switching circuit 416, to change the antenna over to the optimum one which enjoys the best reception selected from among the glass antennas 400, 402, and the high-frequency pickups 406A, 406B.

In this manner, the glass antennas 400, 402 provided on the rear window glass 404 and the high-frequency pickups 406A, 406B provided on the front roof edge consist in combination a diversity reception antenna which enables automatic changeover constantly to the antenna which enjoys superior reception.

FIG. 28a illustrates the directional patterns of the glass antennas which are attached on the rear window glass. The curve 98 is a characteristic curve of the glass antenna 400 mounted on the upper position of the rear window glass and the curve 100 that of the glass antenna 440 mounted on the lower position thereof. As is clear from the curves, the directional characteristic of the glass antenna is substantially non-directional.

FIG. 28b shows the directional characteristics of the high-frequency pickups which are mounted on the front roof edge. The curve 442 shows the directional characteristic of the high-frequency pickup 406B mounted on the right side of the front roof edge and the curve 444 that of the high-frequency pickup 406A mounted on the left side of the front roof edge. The characteristics of the right and left high-frequency pickups deflect rightward and leftward, respectively.

Accordingly, a combination of these characteristics shown by the curves 442 and 446 can compensate for each other's directional characteristic.

In addition, the diversity reception performed by changeover between the antennas mounted on the rear window glass and those mounted on the front roof edges can easily improve the receiving performance.

As described above, the distance between the antennas is required to be $\lambda/4$ to $\lambda/2$ for obtaining space diversity effects with respect to the FM broadcast waves the wavelength $\lambda$ of which is about 4 m. Since the distance between the front roof edge and the rear window glass in a typical car is 1.5 to 2 m, a combination of these antennas in accordance with this embodiment produces adequate space diversity effects.

The mounting position for the second pair of antennas are not limited to the peripheral edge of the front windshield, and may be the front pillars, center pillars or the roof sides.

The mounting position for the first pairs of antennas are not limited to the rear window glass, and may be the front windshield glass.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An automobile diversity antenna system for receiving broadcast waves by a plurality of antennas disposed on a vehicle body and for outputting a selected antenna received signal from one of the plurality of antennas which is in an optimum receiving state, said antenna system comprising:

a first glass antenna disposed on a first portion of window glass of the vehicle body;

a second glass antenna disposed on a second portion of window glass of the vehicle body;

first high-frequency pickup means including a pickup element, a casing containing the pickup element and having an opening through which a portion of the pickup element is exposed and mounting means for disposing the first high-frequency pickup means at a first vehicle body location opposite to a marginal edge portion of the vehicle body where high-frequency surface currents are induced to flow by the broadcast waves to be received; and second high-frequency pickup means including a pickup element, a casing containing the pickup element and having an opening through which a portion of the pickup element is exposed and mounting means for disposing the second high-frequency pickup means at a second vehicle body location opposite to a marginal edge portion of the vehicle body where high-frequency surface currents are induced to flow by the broadcast waves to be received.

2. An automobile diversity antenna system according to claim 1, wherein said first and second glass antennas are provided on the right and left rear quarter glasses, respectively, of said vehicle body.

3. An automobile diversity antenna system according to either of claims 1 and 2, wherein said first and second high-frequency pickup means are longitudinally provided on the right and left front pillars, respectively, of said vehicle body.

4. An automobile diversity antenna system according to either of claims 1 and 2, wherein said first and second high-frequency pickup means are provided on the edge of a front windshield.

5. An automobile diversity antenna system according to either of claims 1 and 2, wherein said high-frequency pickup means are provided on right and left trunk hinges, respectively, of said vehicle body.

6. An automobile diversity antenna system according to either of claims 1 and 2, wherein each of said first and second high-frequency pickup means includes a loop antenna which is fixed along a trunk hinge so as to electromagnetically detect the magnetic flux which is formed by said high-frequency currents flowing on said trunk hinge.

7. An automobile diversity antenna system according to either of claims 1 and 2, wherein each of said first and second high-frequency pickup means includes a detecting electrode provided in close proximity to a trunk hinge so as to detect high-frequency surface currents by electrostatic coupling between said trunk hinge and said detecting electrode.

8. An automobile antenna system according to either of claims 1 and 2, wherein said first and second high-frequency pickup means are provided on the roof edge at positions a distance of more than ¼ wavelengths apart from said first and second glass antennas.

9. An automobile antenna system according to claim 1, wherein said first and second glass antennas are provided at upper and lower positions, respectively, of a rear window, and said first and second high-frequency pickup means are provided at right and left positions, respectively, of a front roof edge.

10. An automobile diversity antenna system according to claim 1, further including antenna output selecting means for comparing the selected received signal to a reference signal level and switching to another selected antenna received signal from another one of the plurality of antennas when the selected received signal is below the reference signal level.

* * * * *